Patented Jan. 27, 1953

2,626,868

UNITED STATES PATENT OFFICE 2,626,868

BIOSYNTHESIZED FEED AND METHOD OF MAKING THE SAME

George I. de Becze, Cincinnati, Ohio, assignor to Schenley Industries, Inc., a corporation of Delaware No Drawing. Application June 16, 1948, Serial No. 33,435

8 Claims. (Cl. 99—5)

My invention relates to the production of certain growth factors or growth materials, by treating aqueous nutrient media with various micro-organisms.

This application is a continuation-in-part of my application Serial No. 785,187, filed in the U. S. Patent Office on November 10, 1947.

In said application Serial No. 785,187, I referred to the use of (a) Escherichia; (b) the colon-Aerobacter group of the Tribe-Escherichaeae; and (c) Aerobacter bacteria in general.

I specifically referred to Aerobacter cloacae, and Aerobacter aerogenes.

In this application, I include the use of Bacillus sphaericus and other aerobic and mesophilic spore-forming bacilli having characteristics substantially the same as those hereinafter described for Bacillus sphaericus. Such micro-organisms are described for example, in the 1948 edition of "Bergey's Manual of Determinative Bacteriology," published by the Williams and Wilkins Company, at pages 727-729, 737, 763, 799-800, 816, 818; and by Smith, "Aerobic Mesophilic Sporeforming Bacteria," in United States Department of Agriculture Misc. Publication No. 559, May 1946, pp. 94-95.

The bacteria which are used in the method of this invention have the following characteristics:

*Vegetative rods.*—Measuring from 0.5-1.2 x 0.5-10 u., mostly 0.6-1.0 x 1.0-7 u., occurring singly, in pairs, and in short and long chains.

*Sporangia.*—Bulged, clavate, spindle shape; single or in chains.

*Spores.*—Usually 0.5-1.5 u. in diameter; round, terminal to subterminal.

*Colonies.*—On nutrient agar usually thin, smooth, translucent, becoming yellowish with age; spreading very quickly on the surface of wet (freshly poured) agar medium; spreading growth rhizoidal, beaded, often several chains of rods get tangled in a parallel and also in a twisted or rope fashion similar to that observed in Bacillus cereus var. mycoides.

*Submerged swarm-rhizoid colonies.*—This is an unusual type of growth peculiar to this strain. Swarm colonies begin to appear usually in 24 to 48 hours at 28-37° C. in nutrient agar; first they appear as small stellate, circular, flatish, whitish submerged colonies with a typical fungus growth appearance to the naked eye. They appear under the surface growth or as isolated submerged colonies advancing under the edges of the superficial growth.

*Nutrient agar slants.*—Growth thin, smooth, beaded, spreading, rhizoid, transparent, opaque.

*Potato plugs.*—Growth thin, soft, spreading, becoming grayish to yellowish-brown within 12 hours to 7 days at 25° C. and 37° C.

*Nutrient broth.*—Uniform turbidity; flocculent sediment; no pellicle.

*Glucose broth.*—After 4-6 days, pH 8.2 to 8.6.

*Voges-Proskauer reaction.*—Negative (acetyl-methyl-carbinol not produced).

*Utilization of citrate (as the only source of carbon).*—Negative.

*Fermentation tests.*—Neither acid nor gas formed from glucose, glycerol, lactose and sucrose.

*Starch hydrolysis.*—Negative.

*Nitrites from nitrates.*—Positive.

*Methylene blue.*—Reduced in 12-24 hrs. at 37° C.

*Salt tolerance.*—Good growth occurred at 25° C. and 37° C. in nutrient broth containing 4.0% NaCl.

*Urease.*—Not produced.

*Maximum temperature for growth.*—60-65° C., better in liquid media than on solid.

*Gelatin hydrolysis.*—Positive, very slow, on plates only (negative in gelatin stabs).

*Milk.*—No change.

*Casein hydrolysis.*—Negative.

*Indol production.*—Negative.

*$H_2S$ production.*—Positive.

*pH Relation.*—Growth slight at pH 4-5.0, very good from pH 6-9.0; an exuberant growth occurred at pH 9.0 within 24 hours at 37° C.

As will be appreciated by those skilled in the art, and as has been pointed out in Smith's publication, above cited, some variation in characteristics occurs even between organisms classified as members of the same species. Accordingly, bacteria deviating in minor respects from the above characterization may be used in the method of the invention. Thus, for example, Bacillus sphaericus Neide, A. T. C. C. 4525, which may be used in conducting the method, is reported in the Bergey Manual, above cited, as not producing nitrites from nitrates; nevertheless, it has been found that cultures resembling the type strain of *Bacillus sphaericus* in every respect except in this property produce the desired growth factor when cultivated according to the method of the invention.

The methods and technique used for the purposes of this invention may be identical with the methods and technique disclosed in said application Serial No. 785,187. I therefore make full reference to the entire disclosure of the methods and technique disclosed in said application Serial No. 785,187, with the same force and effect as if specifically repeated herein, and as part of the disclosure of this application.

For convenience, some of the methods and technique disclosed in said application Serial No. 785,187, are stated herein.

Some complete examples of the method used in this application are as follows:

*Example No. 1*

The raw material is an aqueous liquid which is designated as distillers' entire stillage, which is prepared from cereals. This stillage is used as received from the beer still which is used in producing whiskey. This stillage ordinarily has 8% of solids by weight. It may be an aqueous residue which results from the production of rye whiskey or Bourbon whiskey. In producing rye whiskey, rye and malt are used. In producing Bourbon whiskey, maize, malt and rye are used.

The bulk of the coarse suspended particles of said distillers' entire stillage is removed by screening. The resultant aqueous liquid is designated as distillers' thin stillage, which ordinarily has 6% of solids by weight.

This distillers' thin stillage is enriched by adding to every 100 ml. of said distillers' thin stillage, certain inorganic supplements, namely 0.1 gram of calcium superphosphate, and also 0.2 gram of calcium carbonate.

The pH of the enriched distillers' thin stillage is adjusted from its original pH of about 4, to a pH of 5.5 or substantially 5.5, by adding hydrated lime. This initial, adjusted pH range is preferably 5-5.5, or substantially 5-5.5.

This aqueous medium is then optionally sterilized by heat, cooled to 30° C., and inoculated at 30° C., with 2% by weight of a pure and strong inoculum of *Bacillus sphaericus* Neide. In many cases, it is preferred not to sterilize said stillage and to use it with the microorganisms naturally occurring therein.

After said inoculation, and while said temperature is maintained at 30° C., the medium is continuously and vigorously agitated and aerated with air. This temperature range may be 26° C.-34° C.

Air is supplied per minute at the rate of 50-300 liters of air per one thousand liters of the liquid medium.

This aeration and agitation is continued for 24-48 hours, while the *Bacillus sphaericus* Neide is grown under conditions of submerged culture.

At the end of this period of 24-48 hours, the final pH of the liquid medium is above 7. This final pH is preferably at least 7.5, or at least substantially 7.5. This final pH may be 7.5–8. This pH is adjusted to 5.5 or substantially 5.5 by the addition of sulfuric acid. This adjusted pH may be 5–5.5.

The liquid is then dried to secure an end-product residue which has 95% of solids by weight. The liquid is thus dried at a pressure of 200–250 mm. of mercury and at a temperature of 65° C.–70° C.

The analysis of the dried residue or end-product shows a 15% increase by weight in proteinaceous matter, an increase of 12 micrograms of riboflavin per gram of solids in the starting material to 60 micrograms of riboflavin per gram of solids, and the presence of growth factors in the end-product, as indicated by animal experiment.

*Example No. 2*

The process is the same as in No. 1, save that prior to enriching the distillers' thin stillage with the inorganic salts, such distillers' thin stillage is diluted with water to a solids content of 1–4% by weight. This results in a 20% increase in proteinaceous matter, and an increase of riboflavin from 12 micrograms of riboflavin per gram of solids, to 96 micrograms of riboflavin per gram of solids.

*Example No. 3*

The process is the same as in No. 2, save that the diluted and enriched distillers' thin stillage is first inoculated with 5% by weight of an aqueous yeast inoculum, which has 3% by weight of *Saccharomyces cerevisiae.*

Bakers' yeast cake or purified brewers' yeast can be used as the yeast inoculum.

The liquid medium is continuously agitated and aerated as above described, for a period of two hours after the addition of the yeast inoculum.

The medium is then inoculated with 0.5% by weight of a pure and strong inoculum of *Bacillus sphaericus* Neide. The rest of the process is as stated in Example No. 2.

In this example, there is a true combination or symbiosis. It is thought that probably the *Bacillus sphaericus* Neide attacks the vegetable proteinaceous material and the higher carbohydrates of the starting material, thus supplying carbon nutrient for the yeast.

*Example No. 4*

This is the same as Example No. 3, save that the diluted distillers' thin stillage is supplemented with 0.3 gram of ammonium sulfate and 0.2 gram of calcium superphosphate per 100 cubic centimeters of said raw material, preferably in addition to 0.2 gram of calcium carbonate.

This results in a 55% increase in proteinaceous matter and a 900% increase in riboflavin.

In general, if the aqueous medium has a volume of 100,000 liters, I may supply 5,000–15,000 liters of air per minute, as measured under normal pressure of 760 mm. of mercury.

The invention is not limited to the use of *Saccharomyces cerevisiae* with the selected bacillus. As one alternative example, reference is made to *Torula utilis*, which is also designated as Torulopsis.

Other starting materials which may be used are, for example, (*a*) the residual broth which results from a penicillin-producing fermentation and the subsequent extraction of the penicillin from the fermented broth; (*b*) the mycelium of the penicillin-producing mold; (*c*) waste products of dairy industries including whey; (*d*) waste products which result from the extraction of starch from various raw materials, such as maize and the like; (*e*) dilute aqueous solutions of molasses; (*f*) the spent liquor of butyl-acetonic fermentation; (*g*) by-products which result from the processing of fish and meat, such as blood and other nitrogenous products; (*h*) paper mill waste; (*i*) amino acids; cannery waste and by-products of canning operations; (j) spoiled or autolyzed bakers' or brewers' or distillers' yeast.

When the waste products of starch manufacture are used, such waste products are made into a water paste, which is cooled and converted by hydrolysis with amylase in the usual manner. This product is diluted with water to 1%–4% of solids by weight, and supplemented and treated as above-described in the examples.

If raw beet molasses or raw case molasses is used, this starting material is diluted and supplemented and treated as above-described.

*Preparation of inoculum*

A pure culture of Bacillus sphaericus Neide is maintained at 30° C. on the surface of a sterile aqueous agar nutrient medium which has carbohydrate nutrient, nitrogenous nutrient, and nutrient salts such as dibasic potassium phosphate, $K_2HPO_4$, and traces of auxiliary salts. The virulence of these cultures is maintained by weekly transfers to the same medium.

This stock culture is mixed with a sterile aqueous nutrient medium which contains glucose, peptone, aqueous yeast extract, dibasic potassium phosphate or calcium phosphate and traces of the well-known auxiliary salts of iron, magnesium, aluminum, zinc, etc.

This mixture is shaken and aerated at 30° C. under aseptic conditions for 1–2 days, and it is then mixed with a larger batch of such aqueous nutrient medium and thus shaken and aerated for 24 hours, and the mixture is again intermixed with a larger batch of such aqueous nutrient medium and again shaken and aerated at 30° C. for 24 hours.

The improved growth factors in the end-product have substantially the same growth effect as whole liver substance or fish meal.

I believe that the improved growth factors are produced, at least in part, in the bodies of the selected micro-organisms. Also, the improved growth factors may be produced by modifying the water-soluble or water-insoluble proteinaceous matter, if any, in the starting material.

If distillers' stillage and other materials are used as respective starting materials, they contain original prolamin proteinaceous material.

The aeration and agitation are preferably sufficiently vigorous to cause the microorganisms to proliferate and thereby raise the initial pH of substantially 5–5.5, to at least substantially 7.5, during a processing period of 24–48 hours.

The end-product may be a thick syrup instead of being substantially dry.

I claim:

1. A process for producing material containing animal-growth factors that comprises inoculating, with a culture of Bacillus sphaericus Neide, a liquid aqueous nutrient medium having an initial hydrogen ion concentration in the range of approximately pH 5.0 to pH 5.5, and cultivating the organism in the medium at a temperature in the range of approximately 26° C. to 34° C., while agitating and aerating the medium at the rate of approximately 50 to 300 liters of air per 1000 liters of medium per minute, for a period of approximately 24 to 48 hours, until the hydrogen ion concentration in the broth lies within the range of pH 7.5 to pH 8.0.

2. A process as defined in claim 1 wherein the liquid aqueous nutrient medium is distillers' stillage.

3. A process for producing a feed ingredient containing growth factors of whole liver and fish meal that comprises inoculating, with a culture of Bacillus sphaericus Neide, a liquid aqueous nutrient medium having an initial hydrogen ion concentration in the range of approximately pH 5.0 to pH 5.5, and cultivating the organism in the nutrient medium at a temperature in the range of approximately 26° C. to 34° C., while agitating and aerating the medium at a rate of approximately 50 to 300 liters of air per 1000 liters of medium per minute, for a period of approximately 24 to 48 hours, until the hydrogen ion concentration in the broth lies within the range of approximately pH 7.5 to pH 8.0, and subsequently concentrating the cultivation broth by evaporation.

4. A process for producing a feed ingredient containing growth factors of whole liver and fish meal that comprises inoculating an aqueous liquid nutrient medium with a culture of Bacillus sphaericus Neide and a yeast of the group consisting of Saccharomyces cerevisiae and species of the genus Torulopsis, said aqueous liquid nutrient medium having an initial hydrogen ion concentration in the range of approximately pH 5.0 to pH 5.5, and cultivating said microorganism and yeast symbiotically in the said aqueous nutrient medium at a temperature within the range of approximately 26° C. to 34° C., while agitating and aerating the medium at a rate of approximately 50 to 300 liters of air per 1000 liters of liquid medium per minute, for a period of approximately 24 to 48 hours, until the hydrogen ion concentration in the broth lies within the range of approximately pH 7.5 to pH 8.0.

5. A process for producing a feed ingredient containing growth factors of whole liver and fish meal that comprises symbiotically cultivating the microorganism Bacillus sphaericus Neide and a yeast of the group consisting of Saccharomyces cerevisiae and species of the genus Torulopsis, in a liquid aqueous nutrient medium comprising supplemented distillers' stillage having an initial hydrogen ion concentration in the range of approximately pH 5.0 to pH 5.5, the nutrient medium being maintained at a temperature in the range of approximately 26° C. to 34° C. and being agitated and aerated at a rate of approximately 50 to 300 liters of air per 1000 liters of liquid medium per minute, for a period of approximately 24 to 48 hours, until the hydrogen ion concentration of the broth is above approximately pH 7.5, and subsequently concentrating the cultivation broth by evaporation.

6. A process for producing a material containing animal-growth factors that comprises preparing a liquid aqueous nutrient medium by admixing with distillers' stillage a small proportion of a soluble inorganic calcium compound and a soluble inorganic phosphorus compound, adjusting the hydrogen ion concentration of the mixture to within the range of approximately pH 5.0 to pH 5.5, inoculating this medium with a culture of the microorganism Bacillus sphaericus Neide, and cultivating the said microorganism in the medium at a temperature in the range of approximately 26° C. to 34° C., while agitating and aerating the medium at a rate of approximately 50 to 300 liters of air per 1000 liters of liquid medium per minute, for a period of approximately 24 to 48 hours, until the hydrogen ion concentration of the broth is approximately pH 7.5 to pH 8.0.

7. A process as defined in claim 6 further characterized in that the medium is also supplemented with a soluble inorganic nitrogen nutrient.

8. A process as defined in claim 7 further characterized in that a yeast of the group consisting of *Saccharomyces cerevisiae* and species of genus *Torulopsis* is symbiotically cultivated with said microorganism.

GEORGE I. DE BECZE.

REFERENCES CITED

The following references are of record in the file of this patent:

UNITED STATES PATENTS

| Number | Name | Date |
|---|---|---|
| 2,098,200 | Stiles | Nov. 2, 1937 |
| 2,123,078 | Muller | July 5, 1938 |
| 2,202,161 | Miner | May 28, 1940 |
| 2,262,735 | Schultz et al. | Nov. 11, 1941 |
| 2,370,177 | Legg et al. | Feb. 27, 1945 |
| 2,424,003 | Tanner et al. | July 15, 1947 |
| 2,447,814 | Novak | Aug. 24, 1948 |
| 2,515,135 | Petts | July 11, 1950 |

OTHER REFERENCES

Bergey's Manual of Determination Bacteriology, 1948 ed., pp. 727–729, 737, 763, 799–800, 816, and 818.

J. Bact., July 1941, pp. 151–2, by Tittsler and Whittier.

U. S. Dept. of Agr. Misc., Pub. No. 559, May 1946, pp. 94–5.